(12) United States Patent
Borza et al.

(10) Patent No.: US 10,169,467 B2
(45) Date of Patent: Jan. 1, 2019

(54) QUERY FORMULATION VIA TASK CONTINUUM

(71) Applicant: Microsoft Technology Licensing, LLC, Redmond, WA (US)

(72) Inventors: Paul Valentin Borza, Redmond, WA (US); Junyan Lin, Bellevue, WA (US); Vaibhav Parikh, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 647 days.

(21) Appl. No.: 14/736,080

(22) Filed: Jun. 10, 2015

(65) Prior Publication Data
US 2016/0275194 A1    Sep. 22, 2016

Related U.S. Application Data

(60) Provisional application No. 62/134,681, filed on Mar. 18, 2015.

(51) Int. Cl.
*G06F 17/30* (2006.01)
*H04L 29/08* (2006.01)

(52) U.S. Cl.
CPC .... *G06F 17/30867* (2013.01); *G06F 17/3053* (2013.01); *G06F 17/30395* (2013.01); *G06F 17/30528* (2013.01); *G06F 17/30554* (2013.01); *H04L 67/22* (2013.01); *H04L 67/306* (2013.01)

(58) Field of Classification Search
CPC ......... G06F 17/30029; G06F 17/30761; G06F 17/30828; G06F 17/30867; G06F 17/30395; G06F 17/30528; G06F 17/3053; G06F 17/30554; H04L 67/22; H04L 67/306
See application file for complete search history.

(56) References Cited

U.S. PATENT DOCUMENTS

| | | | |
|---|---|---|---|
| 6,615,312 B1 * | 9/2003 | Hamlin | G06F 17/30017 707/E17.009 |
| 7,603,349 B1 | 10/2009 | Kraft et al. | |
| 7,610,279 B2 | 10/2009 | Budzik et al. | |
| 7,725,485 B1 | 5/2010 | Sahami et al. | |

(Continued)

FOREIGN PATENT DOCUMENTS

WO    2013130215 A1    9/2013

OTHER PUBLICATIONS

Salton et al. Improving Retrieval Performance by Relevance Feedback, Jun. 1990, 10 pages (Year: 1990).*

(Continued)

*Primary Examiner* — Noosha Arjomandi

(57) ABSTRACT

Architecture that comprises a mediation component which identifies engaged applications and, gathers and actively monitors information from the engaged applications (e.g., text displayed directly to the user, text embedded in photos, fingerprint of songs, etc.) to infer the working context of a user. The inferred context can then be handed over to one of the applications, such as a browser (in a form which does not cross the privacy barrier) to provide improved ranking for the suggested queries through the preferred search provider. Since the context is inferred into concepts, no PII (personally-identifiable information) is communicated without user consent—only very high-level contextual concepts are provided to the search engines.

19 Claims, 10 Drawing Sheets

(56) References Cited

U.S. PATENT DOCUMENTS

| | | | |
|---|---|---|---|
| 8,051,063 B2 | 11/2011 | Guha | |
| 8,122,069 B2 | 2/2012 | Soules et al. | |
| 8,239,363 B2 | 8/2012 | Borton et al. | |
| 8,452,769 B2 | 5/2013 | Altaf et al. | |
| 8,725,725 B2 | 5/2014 | Hammond et al. | |
| 8,762,374 B1 | 6/2014 | Chen et al. | |
| 8,868,590 B1* | 10/2014 | Donneau-Golencer | G06F 17/3053 707/733 |
| 9,305,092 B1* | 4/2016 | Finkelstein | G06F 17/3097 |
| 9,317,585 B2* | 4/2016 | Heymans | G06F 17/30867 |
| 9,642,008 B2* | 5/2017 | Wyatt | H04W 12/08 |
| 9,674,372 B2* | 6/2017 | Karnas | H04M 15/8061 |
| 9,934,331 B2* | 4/2018 | Rampson | G06F 17/3097 |
| 2005/0071323 A1* | 3/2005 | Gabriel | G06F 17/30817 |
| 2005/0267871 A1* | 12/2005 | Marchisio | G06F 17/30672 |
| 2008/0005068 A1 | 1/2008 | Dumais et al. | |
| 2008/0126301 A1* | 5/2008 | Bank | G06F 11/366 |
| 2008/0263537 A1* | 10/2008 | Bleisch | G06F 8/20 717/170 |
| 2009/0327679 A1* | 12/2009 | Huang | G06F 9/4406 713/2 |
| 2011/0258049 A1* | 10/2011 | Ramer | G06F 17/30867 705/14.66 |
| 2011/0264656 A1 | 10/2011 | Dumais et al. | |
| 2012/0023120 A1* | 1/2012 | Kanefsky | G06F 17/3064 707/767 |
| 2012/0269116 A1 | 10/2012 | Xing et al. | |
| 2013/0232552 A1 | 9/2013 | Brush et al. | |
| 2013/0282709 A1 | 10/2013 | Zhu et al. | |
| 2013/0282749 A1* | 10/2013 | Batraski | G06F 17/30864 707/767 |
| 2014/0040238 A1 | 2/2014 | Scott et al. | |
| 2014/0068631 A1* | 3/2014 | Lenahan | G06F 9/542 719/313 |
| 2014/0075393 A1 | 3/2014 | Mei et al. | |
| 2014/0081994 A1* | 3/2014 | Becker | G06F 17/30693 707/749 |
| 2014/0108445 A1* | 4/2014 | Oztekin | G06F 17/3097 707/767 |
| 2014/0280107 A1* | 9/2014 | Heymans | G06F 17/3064 707/727 |
| 2014/0359044 A1* | 12/2014 | Davis | H04L 45/60 709/213 |
| 2015/0127473 A1* | 5/2015 | Simhon | G06F 17/30867 705/14.71 |
| 2015/0127628 A1* | 5/2015 | Rathod | H04W 4/206 707/710 |
| 2015/0154197 A1* | 6/2015 | Lightner | G06F 17/3053 707/748 |
| 2015/0193447 A1* | 7/2015 | Voinea | G06F 17/3064 707/767 |
| 2015/0347423 A1* | 12/2015 | Jheeta | G06F 17/30864 707/767 |
| 2016/0140125 A1* | 5/2016 | Goyal | G06F 17/3097 707/751 |
| 2016/0162172 A1* | 6/2016 | Rathod | G06F 9/4443 715/747 |
| 2016/0179961 A1* | 6/2016 | Wu | G06F 17/30867 707/706 |
| 2016/0224000 A1* | 8/2016 | Chen | G05B 19/0423 |
| 2016/0299975 A1* | 10/2016 | Acar | G06F 17/30519 |

OTHER PUBLICATIONS

"International Search Report and Written Opinion Issued in PCT Application No. PCT/US2016/022401", dated May 31, 2016, 10 Pages.

"Second Written Opinion Issued in PCT Application No. PCT/US2016/022401", dated Apr. 13, 2017, 6 Pages.

"International Preliminary Report on Patentability Issued in PCT Application No. PCT/US2016/022401", dated Jul. 24, 2017, 7 Pages.

Jagtap, et al., "Preserving Privacy in Context-Aware Systems", In Proceedings of Fifth IEEE International Conference on Semantic Computing, Sep. 18, 2011, 5 Pages.

Tang, et al., "IntentSearch: Capturing User Intention for One-Click Internet Image Search", In Proceedings of IEEE Transactions on Pattern Analysis and Machine intelligence, vol. 34, No. 7, Jul. 2012, pp. 1342-1353.

\* cited by examiner

QUERY FORMULATION VIA TASK CONTINUUM

CROSS-REFERENCE TO RELATED APPLICATIONS

This application claims the benefit of U.S. Provisional Patent application Ser. No. 62/134,681 entitled "QUERY FORMULATION VIA TASK CONTINUUM" and filed Mar. 18, 2015, the entirety of which is incorporated by reference herein.

BACKGROUND

Efficiency in task completion is measured through how much time it takes for a user to complete their task. One major contributor to task completion is query formulation. The less time the user has to spend typing a query, looking over results, and then refining subsequent queries just to find the ideal result, the better. One such extreme case is an intelligent personal voice recognition assistant where the user no longer has to type a query on a small touch keyboard, but simply to speak the query. However, speech is not always a preferred way to input text due to various reasons (e.g., privacy).

People use multiple desktop applications in order to complete a single task. For example, if a user is researching the topic of "dancing" for school, the user will use a first application to write things down as well as a second application such as, a browser, to search different styles of dancing. However, in existing systems, the two applications are completely disconnected from each other. The first application does not provide the browser implicit hints as to what the user might be seeking when there is a switch from the first application to the second application. The user perceives tasks in the totality. However, since applications are typically disconnected, and not mediated in any way by the operating system (OS), the computing system has no idea as to the overall goal of the user.

SUMMARY

The following presents a simplified summary in order to provide a basic understanding of some novel implementations described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture comprises a mediation component (e.g., an API (application program interface) as part of the operating system (OS)) that identifies engaged applications—applications the user is interacting with for task completion (in contrast to dormant applications—applications the user is not interacting with for task completion), and gathers and actively monitors information from the engaged applications (e.g., text displayed directly to the user, text embedded in photos, fingerprint of songs, etc.) to infer the working context of a user. The inferred context can then be handed over to one of the applications, such as a browser (the inferred context in a form which does not cross the privacy barrier) to provide improved ranking for the suggested queries through the preferred search provider. Since the context is inferred into concepts, no PII (personally-identifiable information) is communicated without user consent—only very high-level contextual concepts are provided to the search engines.

The architecture enables the capture of signals (e.g., plain text displayed to the user, text recognized from images, audio from a currently playing song, and so on), and clusters these signals into contextual concepts. These signals are high-level data (e.g., words) that help identify what the user is doing. This act of capturing signals is temporal, in that it can be constantly changing (e.g., similar to running average of contextual concepts). The signals can be continuously changing based on what the user is doing at time T (and what the user did from T-10 up to time T).

When using the browser application as the application that uses the captured signals, the browser broadcasts and receives (e.g., continuously, periodically, on-demand, etc.) with the mediation component through a mediation API of the mediation component to fetch the latest contextual concepts.

When the user eventually interacts with, or is anticipated to interact with, the browser (as may be computed as occurring frequently and/or based on a history of sequential user actions that results in the user interacting with the browser next), the contextual concepts are sent to the search provider together with the query prefix. The search engine (e.g., Bing™ and Cortana™ (an intelligent personal digital speech recognition assistant) by Microsoft Corporation) uses contextual rankers to adjust the default ranking of the default suggested queries to produce more relevant suggested queries for the point in time. The operating system, comprising the function of mediation component, tracks all textual data displayed to the user by any application, and then performs clustering to determine the user intent (contextually).

The inferred user intent sent as a signal to search providers to improve ranking of query suggestions, enables a corresponding improvement in user experience as the query suggestions are more relevant to what the user is actually trying to achieve. The architecture is not restricted to text, but can utilize recognized text in displayed photos as well as the geo-location information (e.g., global positioning system (GPS)) provided as part of the photo metadata. Similarly, another signal can be the audio fingerprint of a currently playing song.

As indicated, query disambiguation is resolved due to the contextual and shared cache which can be utilized by various applications to improve search relevance, privacy is maintained since only a minimally sufficient amount of information is sent from one application to the another application, and the inferred user context can be shared across applications, components, and devices.

The mediation component can be part of the OS, and/or a separate module or component in communication with the OS, for example. As part of the OS, the mediation component identifies engaged non-OS applications on the device and, gathers and actively monitors information from the engaged applications to infer the working context of the user. The inferred context can then be passed to one of the applications, such as the browser in a secure way to provide improved ranking for the suggested queries through the preferred search provider.

In yet another implementation, the architecture enables context inference across user devices. That is, the context can be inferred as occurring across user devices rather than solely on a single device running multiple applications. For example, in a Windows™ OS ecosystem of devices, which can include two or more Windows™ devices such as a Windows Phone™, a Surface Pro™ tablet, and Xbox™, etc., the OS of a given device gathers and monitors the information from the non-OS applications engaged on the given device, and communicates with the operating systems of the other devices to enable the OS of each device to have a "global awareness" of the contexts of the other ecosystem devices. These separate device contexts can then be computed to derive a global user context of the ecosystem.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
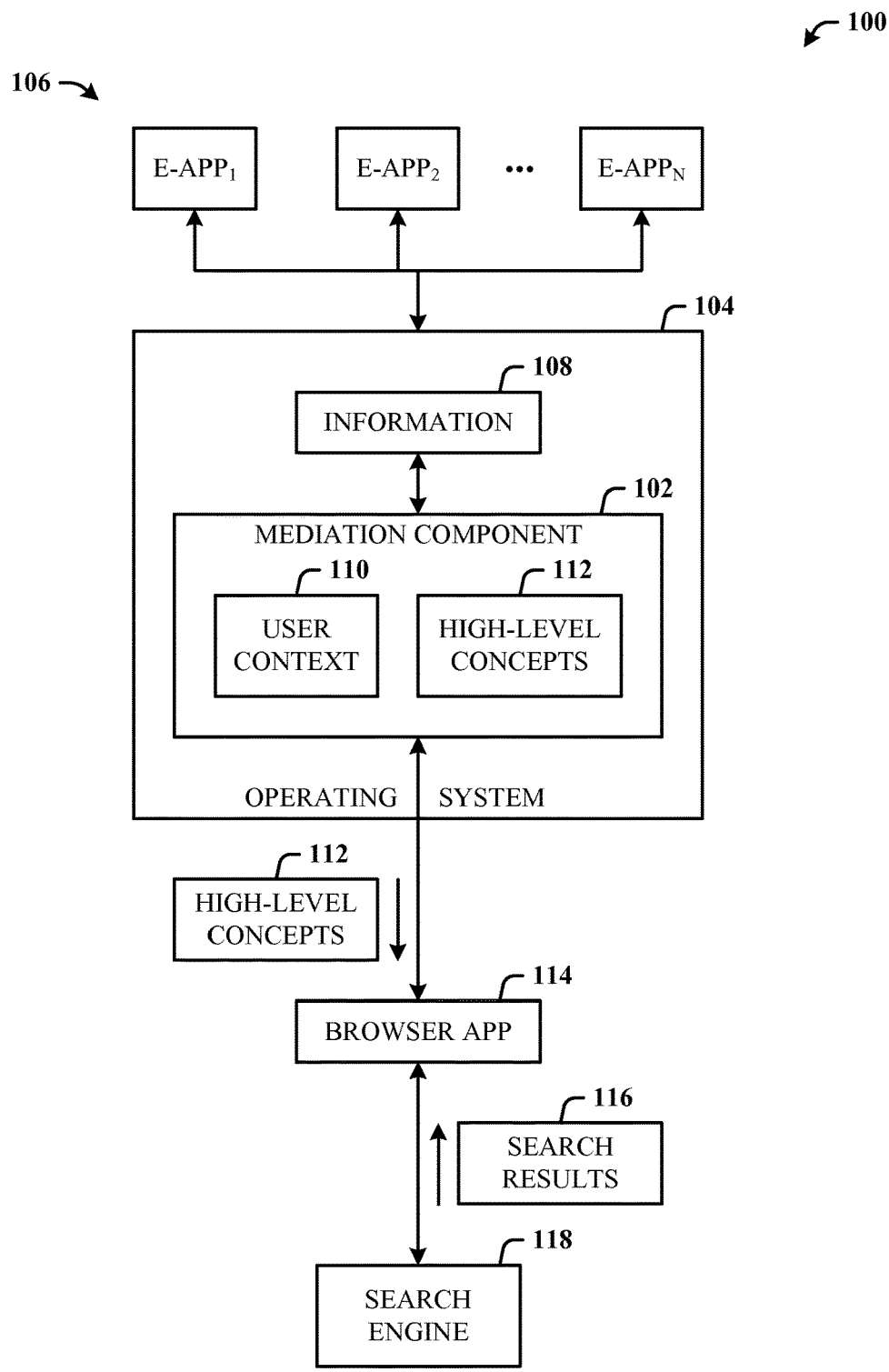
FIG. 1 illustrates a system in accordance with the disclosed architecture.

Efficiency in task completion is measured by how much time is taken by the user to complete their task. One major contributor to task completion is query formulation—the less time the user needs to spend typing a query, reviewing the results, and then refining subsequent queries just to find the ideal result, the better. One such extreme case is Cortana™ (a personal digital assistant application that employs natural language recognition) where the user no longer has to type a query on a small touch keyboard, but simply to speak the query. However, speech is not always the preferred way to input text due to various reasons (e.g., privacy), and this is one example where the disclosed architecture is advantageous.

For example, people typically use multiple desktop applications in order to complete a single task. For example, if a user is researching the topic of "dancing" for a school project, the user may use a note-taking tool (e.g., OneNote™) to write things down, as well as browser (e.g., Internet Explorer™) to search different styles of dancing. In other words, in the sequence of used applications a key sub-task that keeps repeating is searching the web for information.

In existing implementations, the two applications are completely isolated (disconnected) from each other; for example, the note-taking application does not provide the browser implicit hints as to what the user is doing when there is a switch from the note-taking application to the browser application.

The disclosed architecture comprises a mediation component (e.g., an API (application program interface)) as part of the operating system (OS)) that identifies engaged applications, and gathers and actively monitors information from the engaged applications (e.g., text displayed directly to the user, text embedded in photos, fingerprint of songs, etc.) to infer the working context of a user. The inferred context can then be handed over to one of the applications, such as a browser (in a form which does not cross the privacy barrier) to provide improved ranking for the suggested queries through the preferred search provider. Since the context is inferred into concepts, no PII (personally-identifiable information) is communicated without user consent—only very high-level contextual concepts are provided to the search engines.

The architecture enables the capture of signals (e.g., plain text displayed to the user, text recognized from images, audio from a currently playing song, and so on), and clusters these signals into contextual concepts. These signals are high-level data (e.g., words) that help identify what the user is doing. This act of capturing signals is temporal, in that it can be constantly changing (e.g., similar to running average of contextual concepts). The signals can be continuously changing based on what the user is doing at time T (and what the user did from T-10 up to time T).

When using the browser application as the application that uses the captured signals, the browser communicates (e.g., continuously, periodically, on-demand, etc.) with the mediation component through a mediation API of the mediation component to fetch the latest contextual concepts.

The disclosed architecture decreases at least the amount of typing that the user would otherwise incur when formulating queries in the address/query box of a browser when using existing implementations. Furthermore, ambiguous queries can be disambiguated for the user. The mediation component (e.g., the OS) becomes the mediator between all other applications and the browser by making sense of the text displayed on the screen and supplying signals to the browser so the search experience is improved. Where the mediation component is part of the OS, the OS is "aware" of what the user is trying to accomplish as a whole, even when the user switches between different applications.

Additionally, the disclosed architecture captures the separation between multiple concurring tasks which are performed by the same user on one or multiple devices (e.g., listening to a song while writing an email). The introduction of notions such as engaged and dormant applications each of which can contribute to the achievement of separate tasks. In this case the contextual signals that are inferred can be separated and sent as an array to the browser (or other application) as additional data to process for improved ranking adjustments of query formulation suggestions.

Further, machine learning can be employed to generate user personas for enhancement in the accuracy of the query formulation engine. The segmentation (or categorization) of users into types of users can also be realized based on the interaction patterns between applications on an operating system. Users can be classified in several different ways, for example, as targeted users (e.g., a user who likes shopping, a user who likes movies, etc.), as explorer users who shift hobbies from time to time, and so on. Still further, contextual signals from multiple users (e.g. friends of the current user) can be aggregated. The social network contextual signals of a user can be employed to influence the search suggestions of the current user.

Essentially, search need not only be about web results, but also about searching in the user's personal cloud data and other sources. The midway detection of what the user is trying to accomplish (the overall task) and the suggestion of applications the user will need in the following stages of the task to successfully complete the task, is advantageous. This can be referred to as sub-task prediction. The system only assists with the immediate next sub-task, but also with a sequence of future sub-tasks that help in accomplishing the overall task of the user.

The disclosed architecture also facilitates the re-ranking of not only search suggestions (as the user types) and web results based on contextual signals, but also for advertisements, applications, and/or coupons, for example. Moreover, prefetching of web results and instant answers before the user has performed (or even typed) the query, can be provided by computing the likelihood of follow-up queries based on contextual signals.

Consider that an enhancement exists where the operating system (or some other component(s)) augments the context switch from the note-taking application to the browser application with text that was previously entered by (or displayed to) the user. For example, the user may have just entered the words "Dancing" as the title of a newly created note-taking document. The browser can then utilize this information by providing relevant query suggestions to the user, even before the user typed the first character in the address/query box of the browser. Example suggestions could include "Waltz", "Tango", or "Patrick Swayze", all of which can be presented before the user enters any character in the browser query box. Moreover, once the user enters several characters, the suggestion may be adjusted based on the entered prefix and the text from the user's note-taking document.

Although the user may use multiple applications to achieve a goal, the disclosed architecture enables the user to perceive tasks as a whole, without concern for interacting with different applications, in contrast to existing implementations where the applications are disconnected, and not mediated in any way (e.g., by the operating system (OS)).

Described above is one possible interaction between a note-taking application and a browser. However, this is not to be construed as limiting, in that there are many more possible scenarios, such as:

A user is listening to music via music applications (e.g., Spotify or Xbox Music) and wants to learn more about the artist. The user then switches to the browser and starts typing the name of the artist that is currently playing the song. The name of the artist and the song are already displayed to the user as static text in the music application. However, conventionally, the needs to enter the text again in browser query box, since there is no mediation application to mediate the context switch from one application to the other. The disclosed architecture solves this problem by providing the mediation function for the music application and the browser application.

A user browsing is through a friend's photos taken at the Universal Studios Theme Park in Los Angeles. The name "Universal Studios Theme Park" shows up in one of the images taken in front of the gate of the theme park. The user then wants to find airplane ticket prices from Seattle to Los Angeles. In existing implementations, the user has to switch to the browser and type "Universal Studios Theme Park"+"plane tickets" in the query box, which is cumbersome. It would have been easier if a mediation component (e.g., the OS) executed optical character recognition (OCR) on the photos and mediated the context switch from one application to the other. The disclosed architecture solves this problem by providing the mediation function for the OCR application and the browser application.

A user is playing Halo on an Xbox and then switches to the browser on the Xbox (or even on a Windows phone) and queries for "cheats". The Windows ecosystem should have already inferred that the user is referring to "Halo cheats" (not just "cheats"), since the user was just playing the Halo game. By providing context when formulating the query, a search engine is able to provide much more relevant results to the user. The disclosed architecture solves this problem by providing the mediation function for deriving context between the game application and the gaming device application and the browser application.

A user listens to music on an iPod or iPhone and then searches for the artist on her desktop computer. In this case the contextual information is securely shared in the cloud. The disclosed architecture enables this capability between the cloud and the device(s) by providing the mediation function for deriving context between the music application and the player device.

While user input has been described with respect to Cortana and textual input, it is within contemplation of the disclosed architecture that user interaction with a device, OS and/or application can be gesture-enabled, whereby the user employs one or more gestures for interaction. For example, the gestures can be natural user interface (NUI) gestures. NUI may be defined as any interface technology that enables a user to interact with a device in a "natural" manner, free from artificial constraints imposed by input devices such as mice, keyboards, remote controls, and the like. Examples of NUI methods include those methods that employ gestures, broadly defined herein to include, but not limited to, tactile and non-tactile interfaces such as speech recognition, touch recognition, facial recognition, stylus recognition, air gestures (e.g., hand poses and movements and other body/appendage motions/poses), head and eye tracking, voice and speech utterances, and machine learning related at least to vision, speech, voice, pose, and touch data, for example.

NUI technologies include, but are not limited to, touch sensitive displays, voice and speech recognition, intention and goal understanding, motion gesture detection using depth cameras (e.g., stereoscopic camera systems, infrared camera systems, color camera systems, and combinations thereof), motion gesture detection using accelerometers/gyroscopes, facial recognition, 3D displays, head, eye, and gaze tracking, immersive augmented reality and virtual reality systems, all of which provide a more natural user interface, as well as technologies for sensing brain activity using electric field sensing electrodes (e.g., electro-encephalograph (EEG)) and other neuro-biofeedback methods.

The use of these alternative interactive means can also be captured as signals the ultimately determine user context for a single device of multiple applications or across multiple devices and applications.

The disclosed architecture enables the benefit of technical effects that include, but are not limited to, improved usability of applications for the user, enhanced reliability in guiding the user to the parameters that can be used or are needed for a given application for task completion, improved user efficiency by anticipating not only what the given user may want as far as data input for a given application but also expediting task completion across application and devices, and increased user interaction performance by also bringing a next or subsequent application to a given state that facilitates completion of the sub-task by the given application or later applications.

Reference is now made to the drawings, wherein like reference numerals are used to refer to like elements throughout. In the following description, for purposes of explanation, numerous specific details are set forth in order to provide a thorough understanding thereof. It may be evident, however, that the novel implementations can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a system 100 in accordance with the disclosed architecture. The system 100 can include a mediation component 102 as part of an operating system (OS) 104. The mediation component 102 can be configured to identify engaged (E) non-OS applications (E-APPx, where x is an integer) 106 and, gather and monitor information 108 of the engaged non-OS applications 106 to infer user context 110. The mediation component 102 is configured to derive high-level concepts 112 from the inferred user context 110 and pass the high-level concepts 112 to a browser application (Browser App) 114 to facilitate the automatic return of search results 116 from a search engine 118 where the search results are relevant to the inferred user context 110.

Once user context 110 is derived, auto-suggest can be employed to not only provide suggested results for the user, but to also auto-complete queries and other text the user may be entering in a document such as the browser application 114.

The system 100 can also comprise at least one hardware processor configured to execute computer-executable instructions in a memory, the instructions executed to enable at least the mediation component 102.

Figure 2:
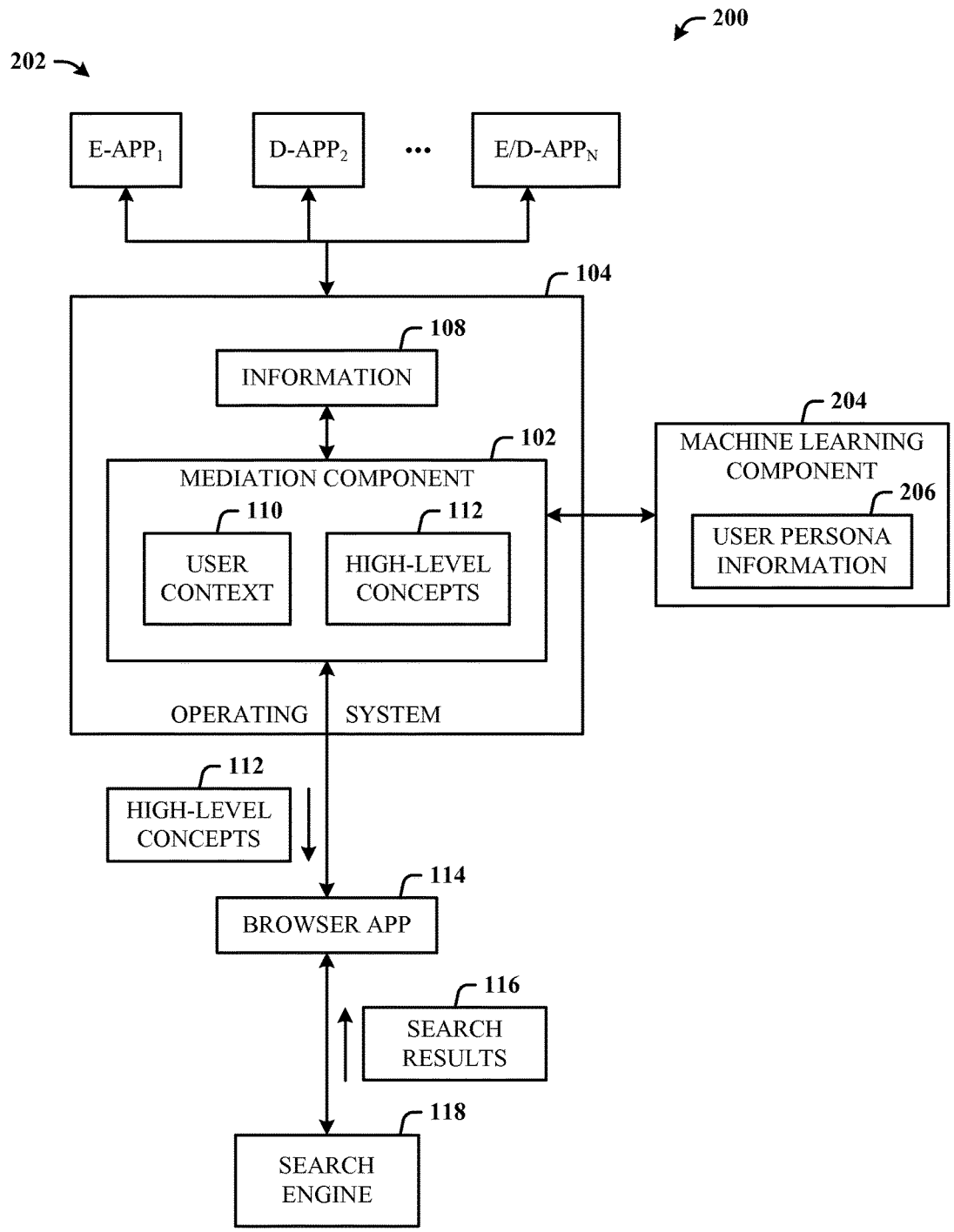
FIG. 2 illustrates an alternative system in accordance with the disclosed architecture.

FIG. 2 illustrates an alternative system 200 in accordance with the disclosed architecture. The system 100 can include the mediation component 102 as part of the OS 104. The mediation component 102 can be configured to identify engaged (A) and dormant (D) non-OS applications (E/D-APPx, where x is an integer) 202 and, gather and monitor information 108 of the engaged non-OS applications (E-APPx) to infer the user context 110.

In this implementation, a machine learning component 204 is included to generate user persona (or profile) information 206. The persona information 204 can change (or evolve) dynamically as the user progresses to task completion, since user behavior and application interactions can change as the sub-tasks are completed.

The mediation component 102 can then derive the high-level concepts 112 from the inferred user context 110 and the persona information 206, and then pass the high-level concepts 112 to the browser application 114 to facilitate the automatic return of the search results 116 from the search engine 118, where the search results are relevant to the inferred user context 110.

As before, once user context 110 is derived, auto-suggest can be employed to not only provide suggested queries for the user, but to also auto-complete query entry and other text the user may be entering in a document such as the browser application 114.

Put another way, the system 100 comprises the mediation component 102, which may or may not be part of an operating system (OS) 104. The mediation component 102 can be configured to identify engaged (e.g., non-OS) applications and, gather and monitor information of the engaged (e.g., non-OS) applications to infer user context 110. The mediation component 102 can also be configured to derive high-level concepts 112 from the inferred user context 110 and pass the high-level concepts to a browser application 114 for processing to automatically return search results relevant to the inferred user context 110.

The mediation component 102 infers the user context 110 at any point in time based on the information of the engaged (e.g., non-OS) applications gathered and monitored at that point in time. The mediation component 102 infers the user context 110 at any point based on the information of the engaged (e.g., non-OS) applications gathered and monitored up to that point in time.

The browser application 114 communicates to the OS 104 through the mediation component 102 to fetch most recent contextual concepts. The OS 104 tracks content presented by the engaged (e.g., non-OS) applications and clusters the content presented to infer the user context 110. The inferred user context 110 is sent to one or more search providers to improve ranking of query suggestions (presented as the user is typing in a query). The derivation of the high-level concepts 112 is absent personally identifiable information. The system 100 (and 200) can further comprise the machine learning component 204 configured to generate user persona information 206 to enhance query formulation.

Figure 3:
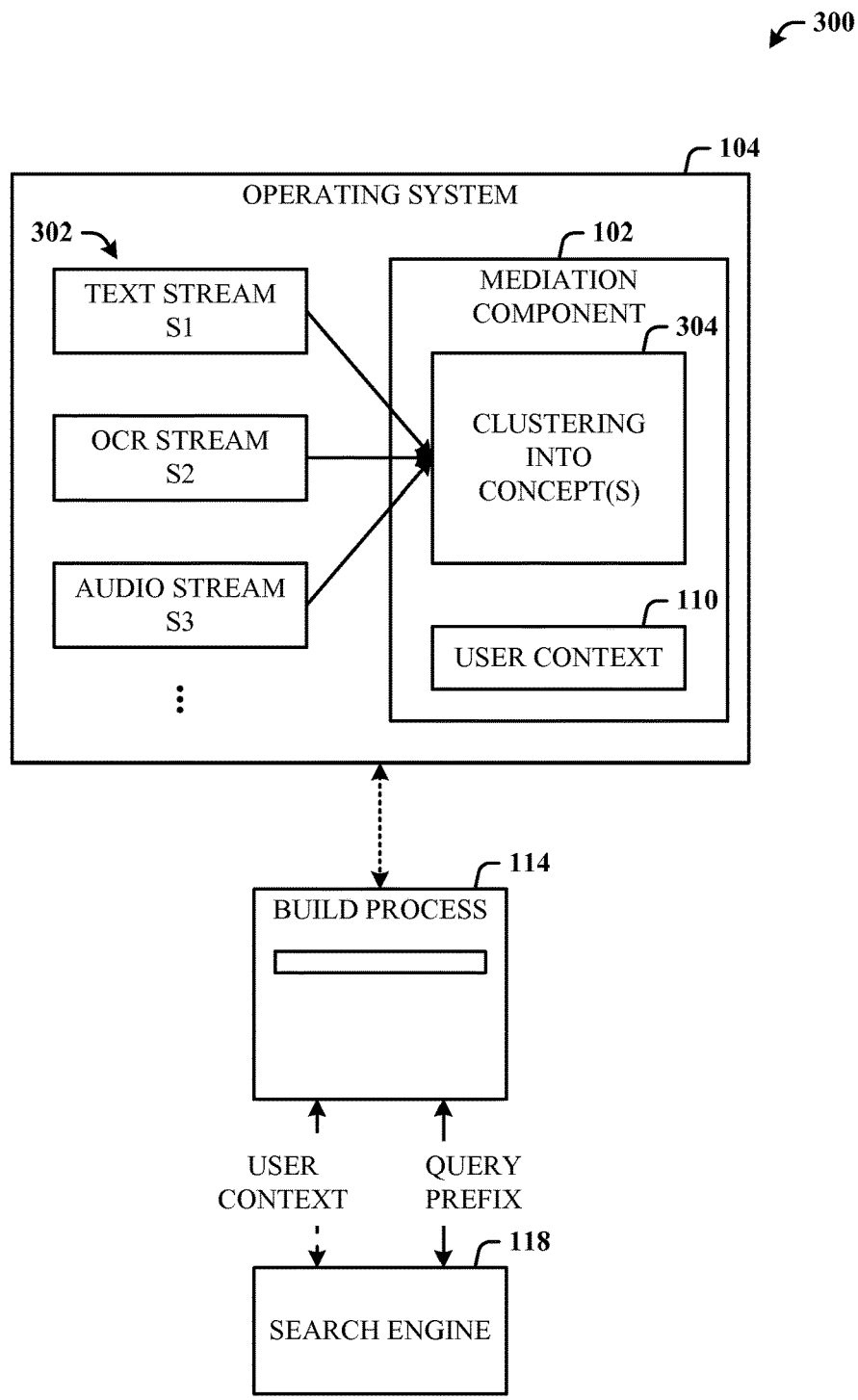
FIG. 3 illustrates an alternative system of query formulation via a continuum of tasks in accordance with the disclosed architecture.

FIG. 3 illustrates an alternative system 300 of query formulation via a continuum of tasks in accordance with the disclosed architecture. While the user is using applications, such as OneNote™, Word™, Outlook™, PowerPoint™, Spotify™, etc., the mediation component 102 of the OS 104 captures signals from data streams 302, such as a text steam S1 (e.g., plain text displayed to the user), an OCR stream S2 (e.g., text recognized from images), an audio stream S3 (e.g., recognized audio from the currently playing song), and other streams, then at 304, clusters the signals into contextual concepts (high-level words which define what the user is doing and/or may be predicted to do). The use of high-level words preserves user privacy.

This step of clustering into the one or more concepts, at 304, is temporal, since the signals are constantly changing based on immediate changes by the user (e.g., what the user is doing at time T, and what the user did from a prior time such as T-10 up to time T).

The browser application 114 can communicate (e.g., continuously) with the OS 104 through the mediation component 102 (e.g., an API) to fetch the latest contextual concepts. Alternatively, the browser application 114 can communicate (e.g., continuously) with the mediation component 102 (e.g., an API) through OS 104 to fetch the latest contextual concepts. When the user eventually uses the browser application 114, the contextual concepts are sent to the search engine 118 together with the query prefix. The search engine 118 uses contextual rankers to adjust the default ranking of the default suggested queries to produce more relevant suggested queries.

The browser application 114 comprises a build process that not only builds queries while text is input to the query field, but also performs auto-complete and auto-suggestion for user input actions.

It is to be understood that in the disclosed architecture, certain components may be rearranged, combined, omitted, and additional components may be included. For example, as described herein in alternative implementations, the mediation component 102 can be part of the OS 104 or external to the OS 104. Similarly, the machine learning component 204 can be part of the OS 104 or external to the OA 104. Additionally, the search engine 118 need not be a web-based search engine, but a search engine local to the user device.

The disclosed architecture can optionally include a privacy component that enables the user to opt in or opt out of exposing personal information. The privacy component enables the authorized and secure handling of user information, such as tracking information, as well as personal information that may have been obtained, is maintained, and/or is accessible. The user can be provided with notice of the collection of portions of the personal information and the opportunity to opt-in or opt-out of the collection process. Consent can take several forms. Opt-in consent can impose on the user to take an affirmative action before the data is collected. Alternatively, opt-out consent can impose on the user to take an affirmative action to prevent the collection of data before that data is collected.

FIGS. 4-7 illustrate various stages of the browser user interface and other engaged applications when employing the disclosed architecture.

Figure 4:
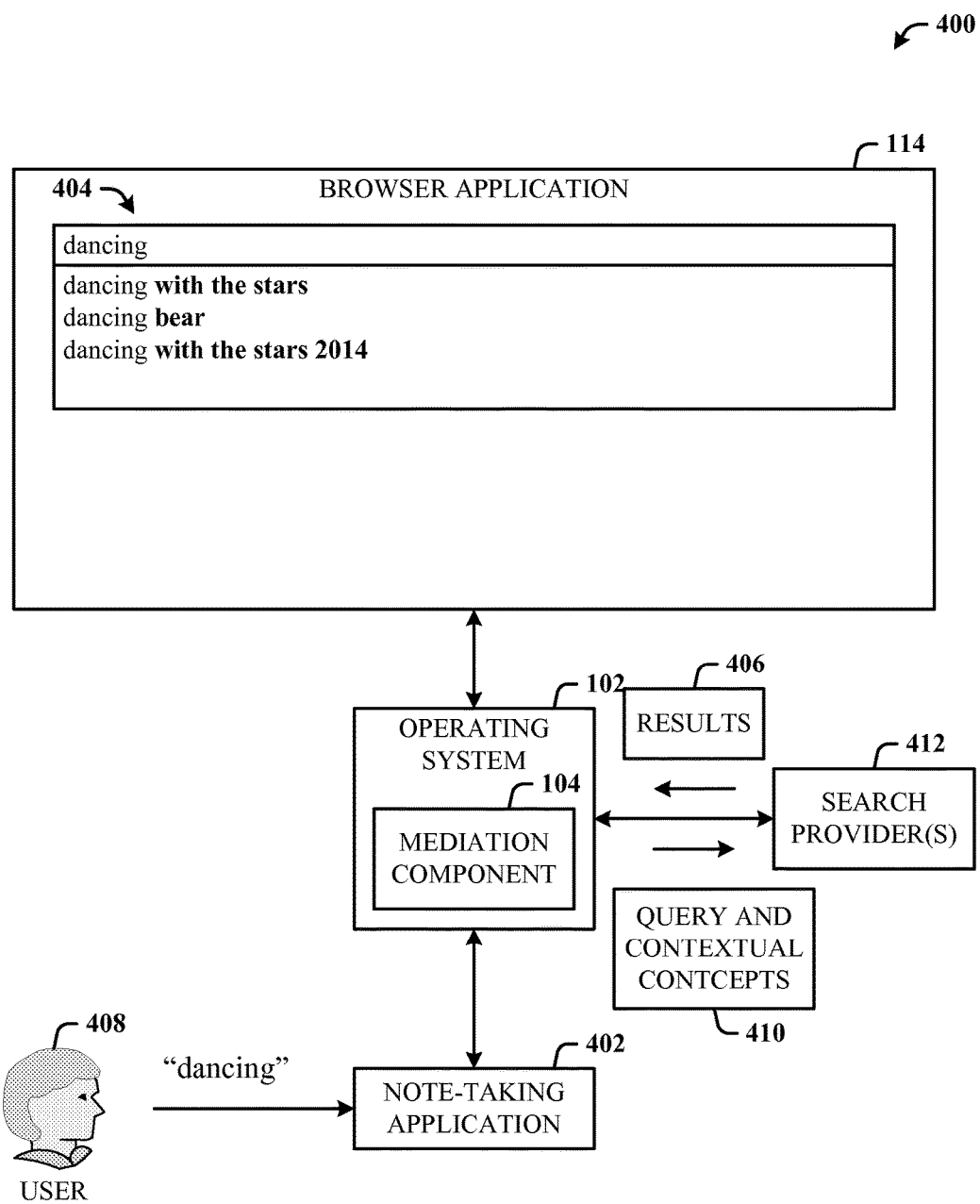
FIG. 4 illustrates a query formulation system using a note-taking application and the browser application to generate relevant query suggestions and results in the note-taking application for completion of a task in accordance with the disclosed architecture.

FIG. 4 illustrates a query formulation system 400 using a note-taking application 402 and the browser application 114 to generate relevant query suggestions 404 and results 406 (similar to results 116 of FIG. 1) in the note-taking application 402 for completion of a task in accordance with the disclosed architecture. In this example, a user 408 enters the search query text "dancing" into a search field of the note-taking application 402, which is installed on a user device (and having the mediation component 104).

The note-taking application 402 sends the search query "dancing" to the mediation component 104, which can be part of, or a module separate from, the operating system 102. The mediation component 104 passes the search query to the operating system 102, and the operating system 102 passes the search query "dancing" to the browser application 114. The browser application 114 can also receive high-level concept information received for query formulation, which includes the "dancing" query.

As shown, the browser application 114 processes the "dancing" query into the query (or search), and can augment the query with the most recent contextual concepts, both of which the query and the most recent contextual concepts 410 are sent to one or more search providers 412.

Figure 5:
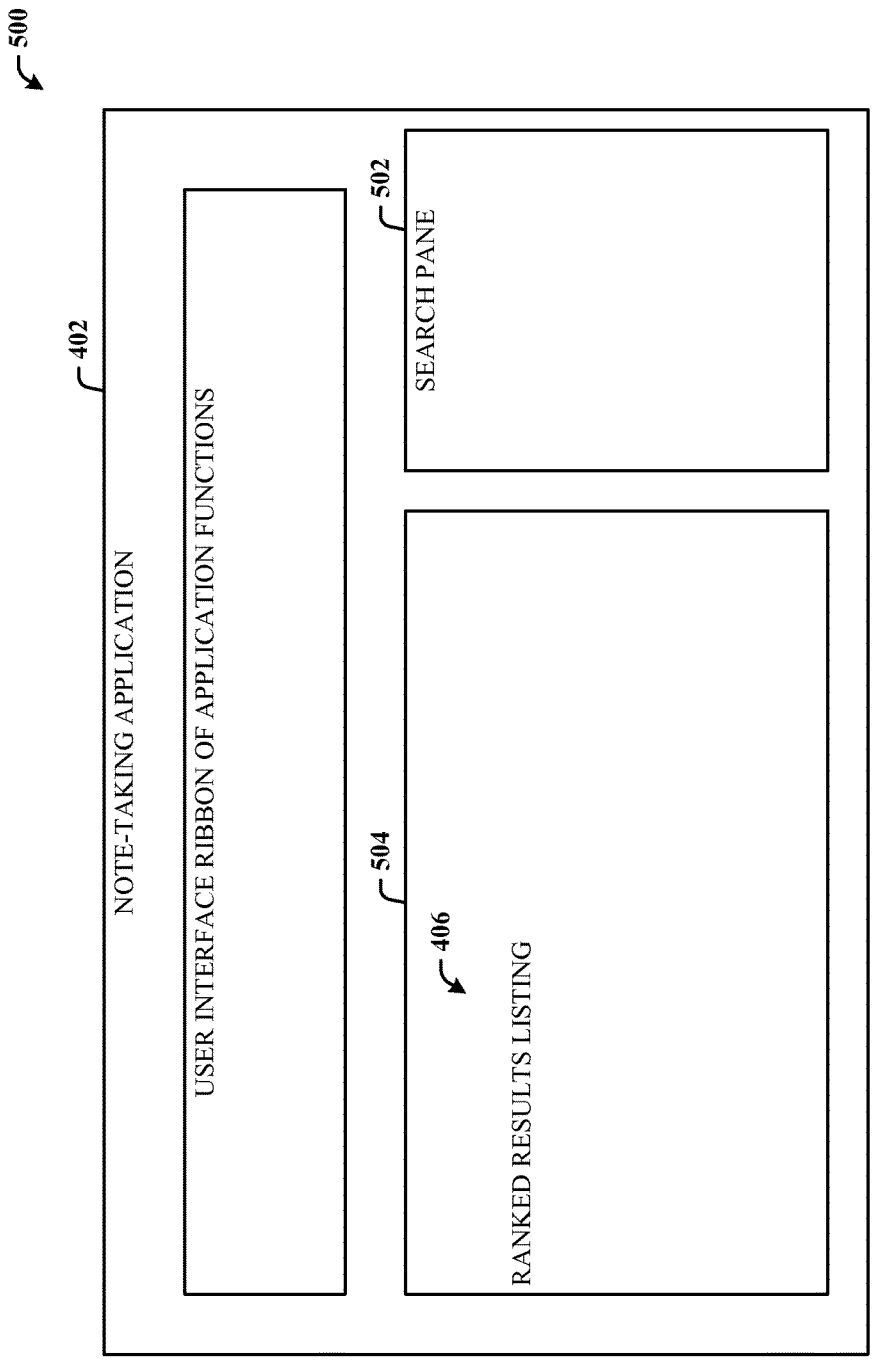
FIG. 5 illustrates a view of the note-taking application showing search results in the note-taking application for completion of a task in accordance with the disclosed architecture.

FIG. 5 illustrates a view 500 of the note-taking application 402 showing search results 406 in the note-taking application 402 for completion of a task in accordance with the disclosed architecture. In this example, the note-taking application 402 can further comprise a search pane 502 via which the user enters the query "dancing". A results pane 504 displays the ranked results listing received via the mediation component into the note-taking application 402. Thus, the mediation component 104 facilitates the unassisted formulation of a query using contextual concepts derived at any point in time.

Figure 6:
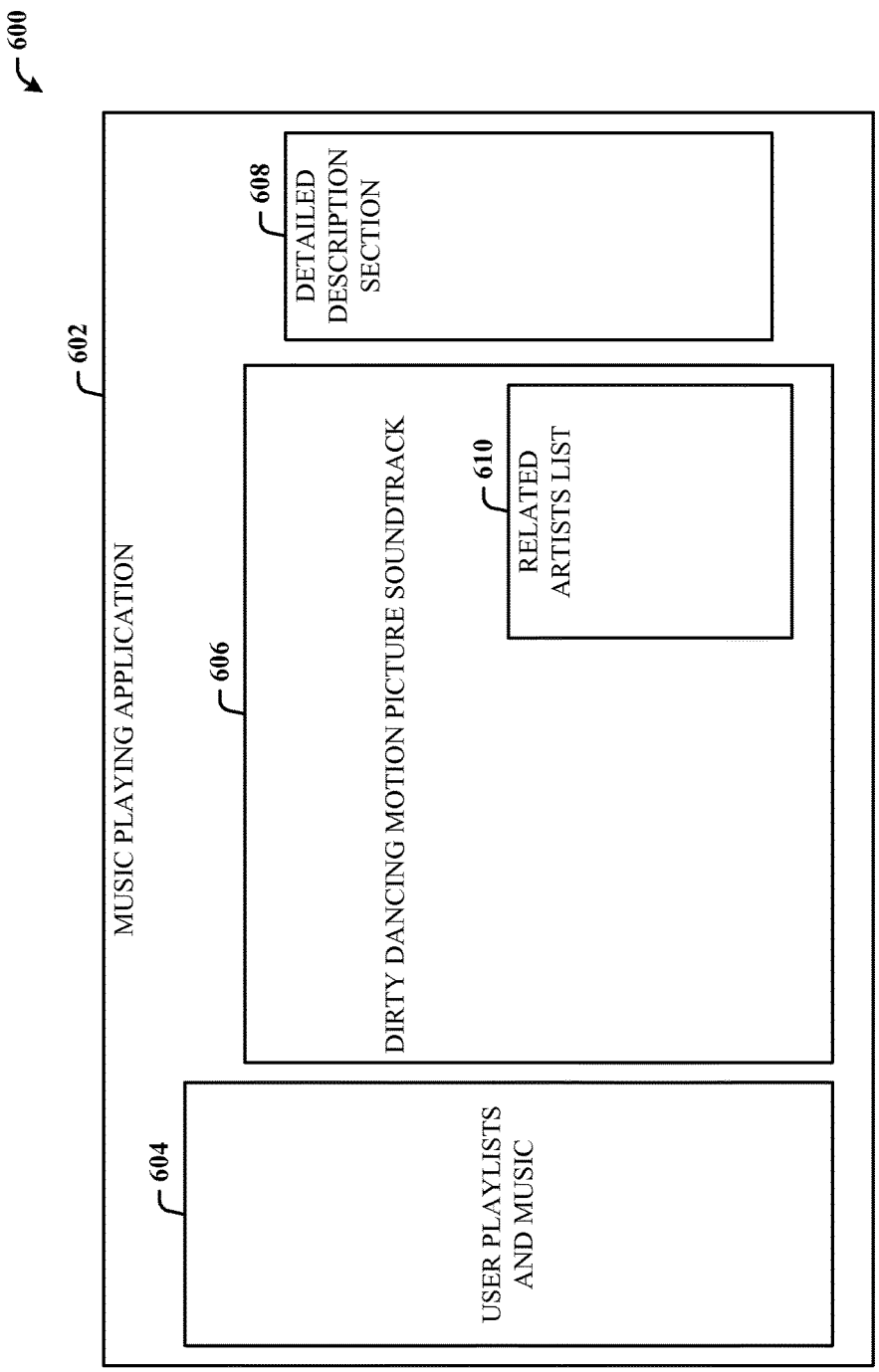
FIG. 6 illustrates a view of a music playing application showing search results 604 for completion of a task in accordance with the disclosed architecture.

FIG. 6 illustrates a view 600 of a music playing application 602 showing search results 604 for completion of a task in accordance with the disclosed architecture. In this example, the user context (intent) at this particular time also includes the music playing application 602 as an engaged application. Thus, the query "dancing", in the previous example, can also get processed for this music playing application 602, as part of the derived contextual concept.

Here, the music playing application 602 can include a user playlists and music section 604, a main window 606 in which the current music is indicated as playing, a detailed description section 608 that provides additional content about an artist, and a related artists list 610, which shows a ranked set of related artists. Thus, the mediation component 104 facilitates the unassisted formulation of a query using contextual concepts derived at any point in time, which can include multiple applications used to complete the task.

Figure 7:
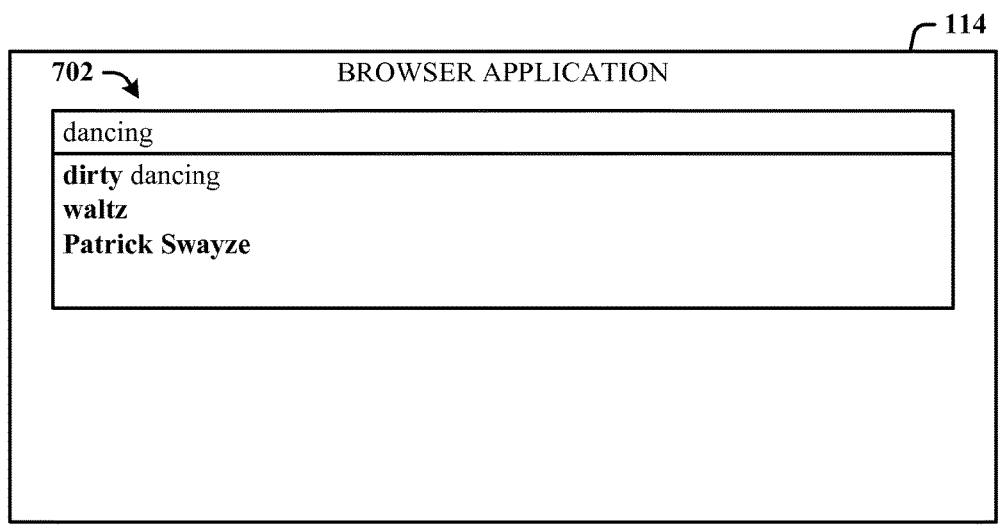
FIG. 7 illustrates a view of query formulation for the music playing application to generate relevant query suggestions and results for completion of a task in accordance with the disclosed architecture.

FIG. 7 illustrates a view 700 of query formulation for the music playing application 602 to generate relevant query suggestions 702 and results for completion of a task in accordance with the disclosed architecture. In this example, a user selects the "Dirty Dancing soundtrack" to play and begins playing it.

The inferred user context includes playing music, and the query along with contextual concepts is passed through the mediation component 104 to the operating system and then the browser application 114. The browser application 114 processes this combination of query information and provides a ranked set of query suggestions that include "dirty dancing" as a top suggestion, and other related and suggested queries such as "waltz" and "Patrick Swayze". These suggested queries can then be used to generate the related artists list 610 of the music playing application 602.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 8:
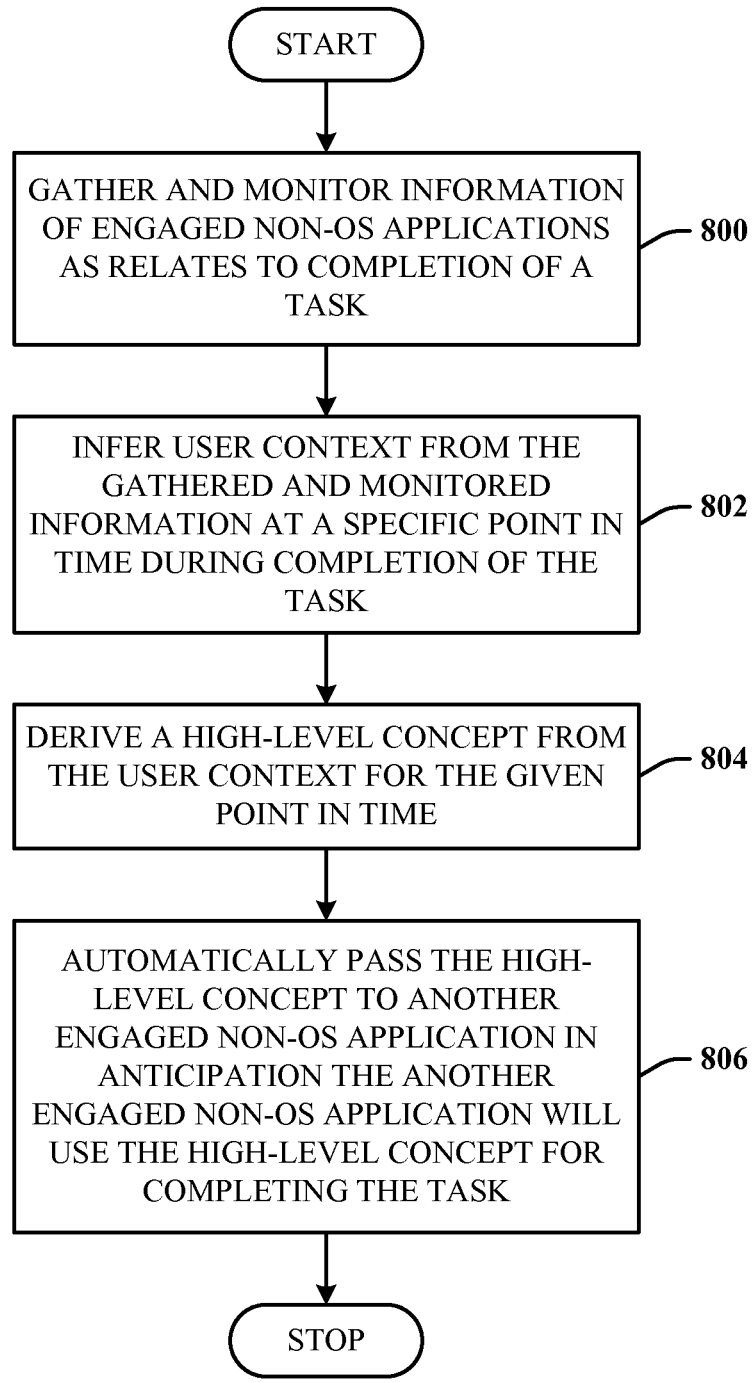
FIG. 8 illustrates a method in accordance with the disclosed architecture.

FIG. 8 illustrates a method in accordance with the disclosed architecture. At 800, information of engaged non-OS applications as relates to completion of a task is gathered and monitored. At 802, user context is inferred from the gathered and monitored information at a specific point in time during completion of the task. At 804, a high-level concept is derived from the user context for the given point in time. At 806, the high-level concept is automatically passed to another engaged non-OS application in anticipation that the another engaged non-OS application will use the high-level concept for completing the task.

The method can further comprise mediating the fetching and the passing of the high-level concept to the another engaged non-OS application using the operating system of the user device. The method can further comprise clustering the information from the engaged non-OS applications to derive the high-level concept.

The method can further comprise sharing the inferred user context across applications and devices. The method can further comprise tracking content presented by one or more of the engaged non-OS applications and clustering the content to infer the high-level concept. The method can further comprise performing the acts of gather and monitoring, inferring, deriving and, fetching and passing, for multiple concurring tasks, the multiple concurring tasks performed by the user on one or more user devices. The method can further comprise performing future sub-task prediction to predict a new sub-task to be performed and future sub-tasks likely to be performed.

Figure 9:
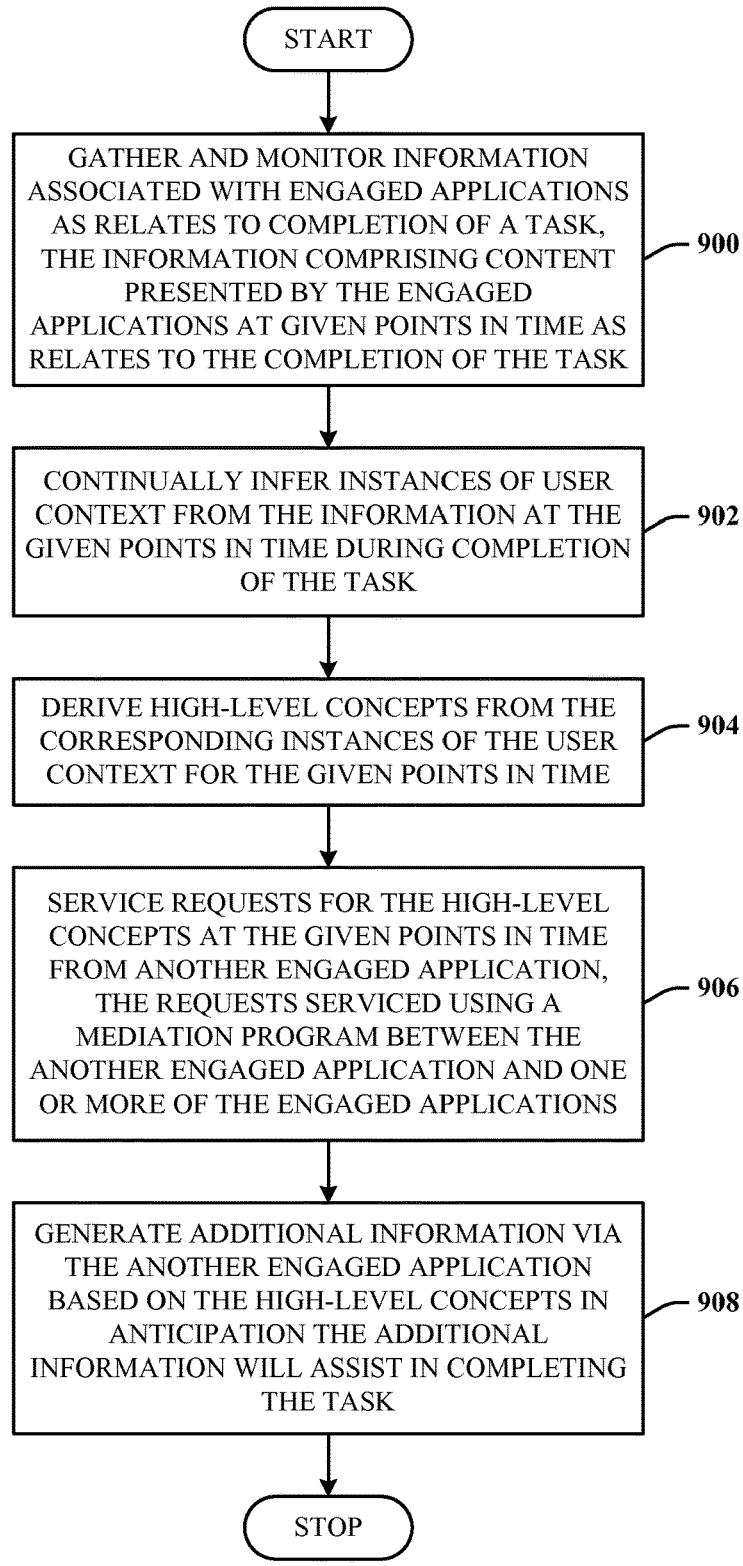
FIG. 9 illustrates an alternative method in accordance with the disclosed architecture.

FIG. 9 illustrates an alternative method in accordance with the disclosed architecture. At 900, information associated with engaged applications as relates to completion of a task, is gathered and monitored, the information comprising content presented by the engaged applications at given points in time as relates to the completion of the task. At 902, instances of user context are continually inferred from the information at the given points in time during completion of the task. At 904, high-level concepts are derived from the corresponding instances of the user context for the given points in time. At 906, requests for the high-level concepts at the given points in time from another engaged application, are serviced, the requests serviced using a mediation program between the another engaged application and one or more of the engaged applications. At 908, additional information is generated via the another engaged application based on the high-level concepts in anticipation the additional information will assist in completing the task.

The method can further comprise generating the additional information, which are search results, via the another engaged application, which is a browser, the search results ranked at the given points in time based on the corresponding inferred instances of user context.

The method can further comprise: gathering and monitoring information of dormant applications; inferring instances of user context from the information of the dormant applications at the given points in time; and sending the instances of user context of the dormant applications and the engaged applications as an array to the browser for ranking of the search results.

The method can further comprise re-ranking search suggestions, web results, advertisements, applications, and rewards based on the inferred instances of user context from the information of the dormant applications and of the engaged applications. The method can further comprise performing future sub-task prediction to predict a new sub-task to be performed and future sub-tasks likely to be performed as part of completing the task.

As used in this application, the term "component" is intended to refer to a computer-related entity, either hardware, a combination of software and tangible hardware, software, or software in execution. For example, a component can be, but is not limited to, tangible components such as one or more microprocessors, chip memory, mass storage devices (e.g., optical drives, solid state drives, magnetic storage media drives, etc.), computers, and portable computing and computing-capable devices (e.g., cell phones, tablets, smart phones, etc.). Software components include processes running on a microprocessor, an object (a software entity that maintains state in variables and behavior using methods), an executable, a data structure (stored in a volatile or a non-volatile storage medium), a module (a part of a program), a thread of execution (the smallest sequence of instructions that can be managed independently), and/or a program.

By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 10:
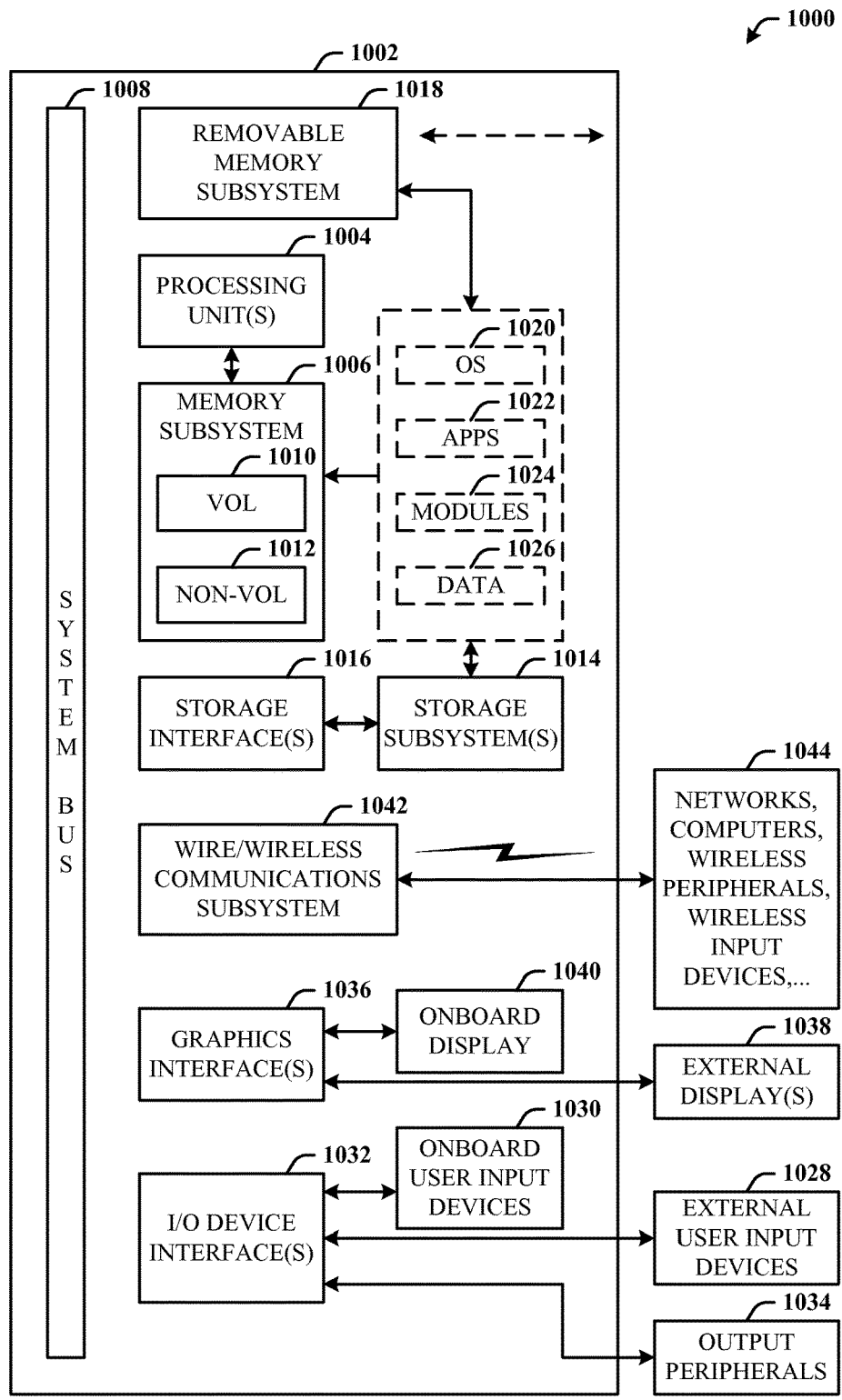
FIG. 10 illustrates a block diagram of a computing system that executes query formulation via a task continuum in accordance with the disclosed architecture.

Referring now to FIG. 10, there is illustrated a block diagram of a computing system 1000 that executes query formulation via a task continuum in accordance with the disclosed architecture. Alternatively, or in addition, the functionally described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc., where analog, digital, and/or mixed signals and other functionality can be implemented in a substrate.

In order to provide additional context for various aspects thereof, FIG. 10 and the following description are intended to provide a brief, general description of the suitable computing system 1000 in which the various aspects can be implemented. While the description above is in the general context of computer-executable instructions that can run on one or more computers, those skilled in the art will recognize that a novel implementation also can be realized in combination with other program modules and/or as a combination of hardware and software.

The computing system 1000 for implementing various aspects includes the computer 1002 having microprocessing unit(s) 1004 (also referred to as microprocessor(s) and processor(s)), a computer-readable storage medium (where the medium is any physical device or material on which data can be electronically and/or optically stored and retrieved) such as a system memory 1006 (computer readable storage medium/media also include magnetic disks, optical disks, solid state drives, external memory systems, and flash memory drives), and a system bus 1008. The microprocessing unit(s) 1004 can be any of various commercially available microprocessors such as single-processor, multi-processor, single-core units and multi-core units of processing and/or storage circuits. Moreover, those skilled in the art will appreciate that the novel system and methods can be practiced with other computer system configurations, including minicomputers, mainframe computers, as well as personal computers (e.g., desktop, laptop, tablet PC, etc.), hand-held computing devices, microprocessor-based or programmable consumer electronics, and the like, each of which can be operatively coupled to one or more associated devices.

The computer 1002 can be one of several computers employed in a datacenter and/or computing resources (hardware and/or software) in support of cloud computing services for portable and/or mobile computing systems such as wireless communications devices, cellular telephones, and other mobile-capable devices. Cloud computing services, include, but are not limited to, infrastructure as a service, platform as a service, software as a service, storage as a service, desktop as a service, data as a service, security as a service, and APIs (application program interfaces) as a service, for example.

The system memory 1006 can include computer-readable storage (physical storage) medium such as a volatile (VOL) memory 1010 (e.g., random access memory (RAM)) and a non-volatile memory (NON-VOL) 1012 (e.g., ROM, EPROM, EEPROM, etc.). A basic input/output system (BIOS) can be stored in the non-volatile memory 1012, and includes the basic routines that facilitate the communication of data and signals between components within the computer 1002, such as during startup. The volatile memory 1010 can also include a high-speed RAM such as static RAM for caching data.

The system bus 1008 provides an interface for system components including, but not limited to, the system memory 1006 to the microprocessing unit(s) 1004. The system bus 1008 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 1002 further includes machine readable storage subsystem(s) 1014 and storage interface(s) 1016 for interfacing the storage subsystem(s) 1014 to the system bus 1008 and other desired computer components and circuits. The storage subsystem(s) 1014 (physical storage media) can include one or more of a hard disk drive (HDD), a magnetic floppy disk drive (FDD), solid state drive (SSD), flash drives, and/or optical disk storage drive (e.g., a CD-ROM drive DVD drive), for example. The storage interface(s) 1016 can include interface technologies such as EIDE, ATA, SATA, and IEEE 1394, for example.

One or more programs and data can be stored in the memory subsystem 1006, a machine readable and removable memory subsystem 1018 (e.g., flash drive form factor technology), and/or the storage subsystem(s) 1014 (e.g., optical, magnetic, solid state), including an operating system 1020, one or more application programs 1022, other program modules 1024, and program data 1026.

The operating system 1020, one or more application programs 1022, other program modules 1024, and/or program data 1026 can include items and components of the system 100 of FIG. 1, items and components of the system 200 of FIG. 2, items and components of the system 300 of FIG. 3, items and components of the various user interfaces of FIGS. 4-7, and the methods represented by the flowcharts of FIGS. 8-9, for example.

Generally, programs include routines, methods, data structures, other software components, etc., that perform particular tasks, functions, or implement particular abstract data types. All or portions of the operating system 1020, applications 1022, modules 1024, and/or data 1026 can also be cached in memory such as the volatile memory 1010 and/or non-volatile memory, for example. It is to be appreciated that the disclosed architecture can be implemented with various commercially available operating systems or combinations of operating systems (e.g., as virtual machines).

The storage subsystem(s) 1014 and memory subsystems (1006 and 1018) serve as computer readable media for volatile and non-volatile storage of data, data structures, computer-executable instructions, and so on. Such instructions, when executed by a computer or other machine, can cause the computer or other machine to perform one or more acts of a method. Computer-executable instructions comprise, for example, instructions and data which cause a general purpose computer, special purpose computer, or special purpose microprocessor device(s) to perform a certain function or group of functions. The computer executable instructions may be, for example, binaries, intermediate format instructions such as assembly language, or even source code. The instructions to perform the acts can be stored on one medium, or could be stored across multiple media, so that the instructions appear collectively on the one or more computer-readable storage medium/media, regardless of whether all of the instructions are on the same media.

Computer readable storage media (medium) exclude (excludes) propagated signals per se, can be accessed by the computer 1002, and include volatile and non-volatile internal and/or external media that is removable and/or non-removable. For the computer 1002, the various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods (acts) of the disclosed architecture.

A user can interact with the computer 1002, programs, and data using external user input devices 1028 such as a keyboard and a mouse, as well as by voice commands facilitated by speech recognition. Other external user input devices 1028 can include a microphone, an IR (infrared) remote control, a joystick, a game pad, camera recognition systems, a stylus pen, touch screen, gesture systems (e.g., eye movement, body poses such as relate to hand(s), finger(s), arm(s), head, etc.), and the like. The user can interact with the computer 1002, programs, and data using onboard user input devices 1030 such a touchpad, microphone, keyboard, etc., where the computer 1002 is a portable computer, for example.

These and other input devices are connected to the microprocessing unit(s) 1004 through input/output (I/O) device interface(s) 1032 via the system bus 1008, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 1032 also facilitate the use of output peripherals 1034 such as printers, audio devices, camera devices, and so on, such as a sound card and/or onboard audio processing capability.

One or more graphics interface(s) 1036 (also commonly referred to as a graphics processing unit (GPU)) provide graphics and video signals between the computer 1002 and external display(s) 1038 (e.g., LCD, plasma) and/or onboard displays 1040 (e.g., for portable computer). The graphics interface(s) 1036 can also be manufactured as part of the computer system board.

The computer 1002 can operate in a networked environment (e.g., IP-based) using logical connections via a wired/wireless communications subsystem 1042 to one or more networks and/or other computers. The other computers can include workstations, servers, routers, personal computers, microprocessor-based entertainment appliances, peer devices or other common network nodes, and typically include many or all of the elements described relative to the computer 1002. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 1002 connects to the network via a wired/wireless communication subsystem 1042 (e.g., a network interface adapter, onboard transceiver subsystem, etc.) to communicate with wired/wireless networks, wired/wireless printers, wired/wireless input devices 1044, and so on. The computer 1002 can include a modem or other means for establishing communications over the network. In a networked environment, programs and data relative to the computer 1002 can be stored in the remote memory/storage device, as is associated with a distributed system. It will be appreciated that the network connections shown are exemplary and other means of establishing a communications link between the computers can be used.

The computer 1002 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi™ (used to certify the interoperability of wireless computer networking devices) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related technology and functions).

The disclosed architecture can be implemented as a system, comprising: means for gathering and monitoring information of non-OS applications as relates to completion of a task; means for inferring user context from the gathered and monitored information at a specific point in time during completion of the task; means for deriving a high-level concept from the user context for the given point in time; and means for automatically passing the high-level concept to another non-OS application in anticipation the another non-OS application will use the high-level concept for completing the task.

The disclosed architecture can be implemented as an alternative system, comprising: means for gathering and monitoring information associated with engaged applications as relates to completion of a task, the information comprising content presented by the engaged applications at given points in time as relates to the completion of the task; means for continually inferring instances of user context from the information at the given points in time during completion of the task; means for deriving high-level concepts from the corresponding instances of the user context for the given points in time; means for servicing requests for the high-level concepts at the given points in time from another engaged application, the requests serviced using a mediation program between the another engaged application and one or more of the engaged applications; and, means for generating additional information via the another engaged application based on the high-level concepts in anticipation the additional information will assist in completing the task.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   one or more processing units; and
   one or more memories storing instructions that, when executed by the one or more processing units, cause the system to perform a method comprising:
   identifying one or more user-engaged non-operating system (non-OS) applications;
   gathering and monitoring content presented by the one or more user-engaged non-OS applications to determine user context, the user context is based on one or more user actions or one or more predicted user actions with the one or more user-engaged non-OS applications;
   determining one or more high-level concepts from the determined user context, wherein each of the one or more high-level concepts is based at least on the one or more user actions or the one or more predicted user actions associated with at least one of the one or more user-engaged non-OS applications;
   passing the one or more high-level concepts to a browser application for query formulation, the query formulation comprising formulating at least a portion of a query;
   based on the query formulation, automatically returning search results relevant to the determined user context; and
   causing the search results to be presented in one of the one or more user-engaged non-OS applications.

2. The system of claim 1, wherein the user context is determined at any point in time based on the content gathered at that point in time.

3. The system of claim 1, wherein the browser application receives one or more most recent contextual concepts from an operating system.

4. The system of claim 1, wherein the method further comprises:
   tracking the content presented by the one or more user-engaged non-OS applications; and
   clustering the presented content to determine the user context.

5. The system of claim 1, wherein the method further comprises transmitting the determined user context to one or more search providers to improve ranking of query suggestions.

6. The system of claim 1, wherein each of the one or more high-level concepts is absent personally identifiable information.

7. The system of claim 1, further comprising a machine learning system configured to generate user persona information to enhance query formulation.

8. A method, comprising:
   gathering and monitoring, at a given point in time during completion of a task, information presented by one or more first user-engaged non-operating system (non-OS) applications, where each of the one or more first user-engaged non-OS applications is an application associated with the completion of the task and the information presented by the one or more first user-engaged non-OS applications is based on one or more user actions or one or more predicted user actions with the one or more first user-engaged non-OS applications;

determining user context from the gathered and monitored information;

determining a high-level concept from the determined user context, wherein the high-level concept is associated at least with the one or more user actions being performed at the given point in time or the one or more predicted user actions at the given point in time with or by at least one of the one or more first user-engaged non-OS applications; and automatically fetching and passing the high-level concept to one or more second user-engaged non-OS applications, wherein at least one of the one or more second user-engaged non-OS applications uses the high-level concept to assist in completing the task.

9. The method of claim 8, further comprising mediating, by an operating system of a computing device, the fetching and the passing of the high-level concept to the one or more second user-engaged non-OS applications.

10. The method of claim 8, wherein determining the high-level concept comprises clustering the gathered information from the one or more first user-engaged non-OS applications to determine the high-level concept.

11. The method of claim 8, further comprising sharing the determined user context across applications and devices.

12. The method of claim 8, further comprising tracking the information presented by the one or more user-engaged non-OS applications and clustering the content to determine the high-level concept.

13. The method of claim 8, further comprising performing the acts of gathering and monitoring the information, determining the user context, determining the high-level concept, and fetching and passing the high-level concept, for multiple concurring tasks performed on one or more computing devices.

14. The method of claim 8, further comprising performing future sub-task prediction to predict a new sub-task to be performed and future sub-tasks likely to be performed.

15. A method, comprising:

gathering and monitoring information associated with one or more user-engaged applications as relates to completion of a task, the information comprising content presented by the one or more user-engaged applications based on one or more user actions or one or more predicted user actions at given points in time;

continually inferring instances of user context from the information at the given points in time;

deriving one or more high-level concepts from the corresponding instances of the user context, wherein each of the one or more high-level concepts are associated at least with the one or more user actions being performed at the given points in time or the one or more predicted user actions at the given points in time;

servicing requests for the one or more high-level concepts from respective user-engaged applications; and generating additional information via the respective user-engaged applications based on the high-level concepts, wherein the additional information is provided to at least one of the one or more user-engaged applications during completion of the task.

16. The method of claim 15, wherein the additional information comprises search results, that are ranked at the given points in time based on the corresponding inferred instances of user context.

17. The method of claim 16, further comprising:

gathering and monitoring, at the given points in time, information of one or more dormant applications;

inferring instances of user context from the information of the one or more dormant applications; and sending the instances of user context inferred from the information of the dormant applications and the instances of user context inferred from the information of the one or more user-engaged applications as an array to a browser for ranking of the search results.

18. The method of claim 17, further comprising re-ranking at least one of search suggestions, web results, advertisements, applications, or rewards based on the inferred instances of user context from the information of the one or more dormant applications and the information of the one or more user-engaged applications.

19. The method of claim 15, further comprising performing future sub-task prediction to predict a new sub-task to be performed and future sub-tasks likely to be performed as part of completing the task.

* * * * *